(12) United States Patent
Rosenfield et al.

(10) Patent No.: US 8,065,213 B2
(45) Date of Patent: Nov. 22, 2011

(54) SYSTEMS AND METHODS FOR TRANSACTION AND INFORMATION MANAGEMENT

(75) Inventors: Stuart Rosenfield, Plano, TX (US); Richard Falcone, Addison, TX (US); John J Viola, Keller, TX (US); Lee R. Johnson, Plano, TX (US)

(73) Assignee: Securus Technologies, Inc., Dallas, TX (US)

( * ) Notice: Subject to any disclaimer, the term of this patent is extended or adjusted under 35 U.S.C. 154(b) by 0 days.

(21) Appl. No.: 12/646,261

(22) Filed: Dec. 23, 2009

(65) Prior Publication Data
US 2010/0100479 A1     Apr. 22, 2010

Related U.S. Application Data

(60) Division of application No. 10/836,976, filed on Apr. 30, 2004, now Pat. No. 7,664,689, which is a continuation-in-part of application No. 10/602,233, filed on Jun. 24, 2003, now Pat. No. 7,640,190.

(51) Int. Cl.
G06Q 40/00      (2006.01)
(52) U.S. Cl. ............................................. 705/35; 705/39
(58) Field of Classification Search .................... 705/35, 705/39, 44
See application file for complete search history.

(56) References Cited

U.S. PATENT DOCUMENTS

| | | |
|---|---|---|
| 5,345,501 A | 9/1994 | Shelton |
| 5,485,507 A | 1/1996 | Brown et al. |
| 6,108,642 A | 8/2000 | Findley |
| 6,668,045 B1 | 12/2003 | Mow |
| 7,042,992 B1 | 5/2006 | Falcone et al. |
| 7,106,843 B1 | 9/2006 | Gainsboro et al. |
| 7,158,621 B2 | 1/2007 | Bayne |
| 7,188,360 B2 | 3/2007 | Gerdes et al. |
| 7,203,301 B1 | 4/2007 | Mudd et al. |
| 7,372,949 B1 | 5/2008 | Kurth et al. |
| 7,376,622 B1 | 5/2008 | Padalino et al. |
| 7,409,423 B2 | 8/2008 | Horvitz et al. |

(Continued)

FOREIGN PATENT DOCUMENTS

WO    WO 98/23062 A1    5/1998

OTHER PUBLICATIONS

Brian Womack, Boise dot.com aids transfers of money to prison inmates, The Idaho Business Review. Boise: Jan. 22, 2001. vol. 20, Iss. 12; p. A7.*
U.S. Appl. No. 10/135,878, John J. Viola, entitled "Information Management and Movement System and Method," filed Apr. 29, 2002.
U.S. Appl. No. 10/135,883, Dick Falcone et al., entitled "Optimizing Profitability in Business Transactions," filed Apr. 29, 2002.

(Continued)

*Primary Examiner* — Lindsay M Maguire
*Assistant Examiner* — Hao Fu
(74) *Attorney, Agent, or Firm* — Fogarty, L.L.C.

(57) ABSTRACT

Systems or methods for managing transactions within a controlled environment facility provide an information management engine integrating transaction functionality and telephone calling functionality, establish an account associated with a resident of the controlled environment facility, and use the information management engine to conduct transactions associated with residents of the controlled environment facility. The transactions include at least requests, by the resident, for deposits into the account by a party outside of the controlled environment facility. The systems or methods accept requests from the resident and utilize the telephone calling services of the information management engine to facilitate the request for deposit. The systems or methods may place calls to the individuals outside the controlled environment facility to interact with the individual, request the deposit and accept such deposits.

18 Claims, 4 Drawing Sheets

U.S. PATENT DOCUMENTS

| | | |
|---|---|---|
| 7,640,190 B1 | 12/2009 | Sullivan et al. |
| 7,664,689 B1 | 2/2010 | Rosenfield et al. |
| 2002/0095357 A1 | 7/2002 | Hunter et al. |
| 2003/0076940 A1* | 4/2003 | Manto .................. 379/114.05 |
| 2004/0029561 A1 | 2/2004 | Holter et al. |
| 2004/0029564 A1 | 2/2004 | Hodge |
| 2005/0141678 A1 | 6/2005 | Anders |
| 2007/0041545 A1 | 2/2007 | Gainsboro |

OTHER PUBLICATIONS

U.S. Appl. No. 10/360,442, Richard Falcone et al, entitled "Systems and Methods for Transaction Authorization Determination," filed Feb. 7, 2003.

Brian Womack, Boise dot.com aids transfers of money to prison inmates, The Idaho Business Review, Jan. 22, 2001.

* cited by examiner

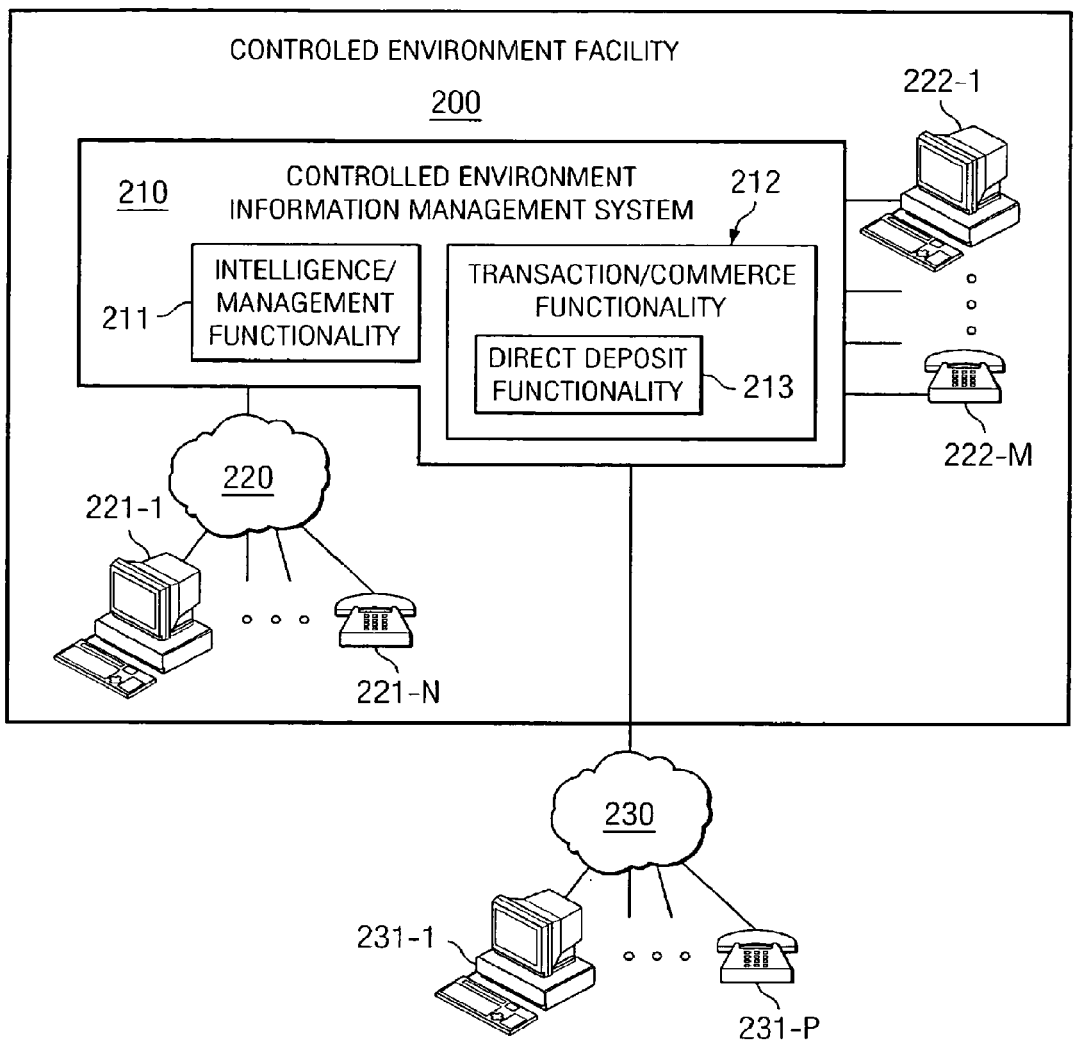
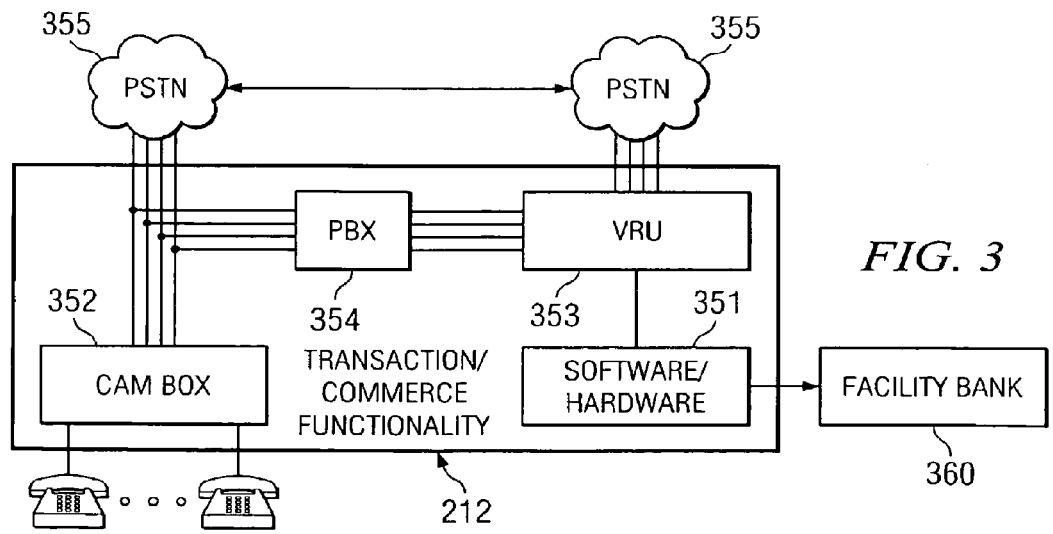

SYSTEMS AND METHODS FOR TRANSACTION AND INFORMATION MANAGEMENT

CROSS-REFERENCE TO RELATED APPLICATIONS

The present application is a divisional of co-pending U.S. patent application Ser. No. 10/836,976, filed Apr. 30, 2004, and entitled "Systems and Methods for Transaction and Information Management," which application is a continuation-in-part of United States patent application Ser. No. 10/602,233 entitled "Systems and Methods for Transaction and Information Management", filed Jun. 24, 2003, the disclosures of which are hereby incorporated herein by reference in their entirety.

TECHNICAL FIELD

The present invention is generally related to transaction systems, and more particularly, to systems and methods utilizing information communication systems for facilitating deposits into transaction systems.

BACKGROUND OF THE INVENTION

In a controlled environment, such as within a prison or jail facility, controlling access, information, interaction, and/or transactions is often of particular interest. In a prison facility in particular, safety and security is of paramount importance and, therefore, the number one job of the personnel thereof is to effectively implement controls with respect to the residents (inmates) thereof. However, such controlled environments often provide an environment much like a small city in which a number of individuals work and live, thus requiring various goods and/or services associated with civilized society. Accordingly, various exchanges of information, money, goods, etcetera may be performed in association with individuals of a controlled environment, both within the controlled environment and external thereto. For example, an inmate residing in a prison facility may be allowed to place phone calls to friends and family outside of the prison facility. Likewise, an inmate may be allowed to purchase commissary items, such as through use of a prepaid account funded by friends and family, such as when visiting the prison facility or by mailing checks or money orders on behalf of an inmate. An inmate may also be provided medical services, such as dispensing of prescription medications.

Administering the aforementioned exchanges of information, money, goods, etcetera typically requires the time and efforts of the staff of the controlled environment facility and/or individuals associated with various service providers thereto. For example, prison and/or commissary personnel may be required to accept payments directly from visitors or receive mail including payments, identify the individual resident for which the funds are intended, access an account associated with the individual resident, and increment the balance thereof. Each such task requires time away from prison personnel's primary tasks associated with the operation of the controlled environment facility and/or increases the costs associated with a service provider serving that population. Moreover, such tasks as accomplished today are typically largely paper based and require appreciable manual processing, thereby further aggravating the directing of personnel's attention away from tasks more primary to the operation of the controlled environment facility and further adding to the costs. FIG. 1 illustrates a typical prior art commissary process flow. In addition to issues with respect to taking time and attention away from tasks of primary importance, the aforementioned exchanges may present increased safety and other issues. For example, increased contact between prison personnel and inmates can increase the danger to the prison personnel, thus interaction associated with collection of monies by prison personnel for deposit in inmate accounts can expose such personnel to claims of theft of such monies. Further, in an incarceration environment, using prison or jail personnel to retrieve account balances, and the like, is time consuming for these personnel taking time away from their primary duties and causing distractions which can present a security risk. Accordingly, inefficiencies exist with respect to the businesses and individuals conducting such exchanges associated with controlled environment facilities.

Individuals external to a controlled environment facility, which conduct exchanges therewith are often less than satisfied with the experience. For example, depositing monies on behalf of a friend or family residing within a controlled environment facility typically requires delivering such monies directly to the controlled environment facility or sending checks or money orders by mail, leaving little flexibility with respect to the forms and timing of payment. Additionally, the sending party may not be provided with any confirmation of the monies received. Furthermore, it is typically somewhat impractical for a resident of a controlled environment facility to request account deposits from third parties, as the resident's ability to communicate with parties outside of the facility are typically restricted.

SUMMARY

The present invention is directed to systems and methods, which utilize information communication systems for transaction and information management. According to embodiments of the invention, an automated information management engine is provided enabling and facilitating the direct deposit of funds into accounts, securely and conveniently, by third parties. Embodiments of the present invention are particularly useful with respect to transactions and information management associated with controlled environment facilities, such as inmate facilities (e.g., municipal jails, county jails, state prisons, federal prisons, military stockades, juvenile facilities, and detention camps), hospitals, nursing homes, camps, schools, and the like. Further, the present invention may be used by other controlled environment facilities as well, particularly those that have commissary or "store" facilities and where residents do not generally have much cash on their person.

The present invention provides systems and methods for direct deposit of funds into an account maintained for the benefit of a resident of a controlled environment facility, preferably at the behest of the resident. These funds may be deposited into the account, which may be in the form of a trust account or the like, for commissary or other use by the resident. A party that may not wish to become responsible for a resident's account may be willing to make deposits into such an account, from time to time, particularly at the behest of a resident. Preferably, the present systems and methods facilitate the acquisition of such deposits by providing a manner in which the resident can initiate a request for funds from a benefactor. Further, in accordance with the present systems and methods the request results in the benefactor be contacted to ask that the benefactor deposit funds directly into the resident's account. Preferably, this contact is carried out in an automated manner using Interactive Voice Response (IVR) technology. The present systems and methods may also make use of a terminal or the like disposed in a facility, such as in a visitation area of a jail or prison, entry foyer of a nursing home, a nurse's station of a hospital floor, or the like, to accept deposits from visiting parties, such as may be requested by a resident during a visit.

Screening may be used in conjunction with the present systems and methods for such purposes as setting limits on deposits and the like, as well as for investigative purposes. This screening may be carried out in real-time or the screening may call a designated party when the screening indicates that an alert is warranted.

A preferred embodiment of the invention utilizes a telephony system, and/or other information communication system, having access terminals disposed within a controlled environment facility for use by residents thereof. Such access terminals may comprise general-purpose user terminals, such as telephones, computer systems, personal digital assistants, etcetera, and/or special purpose user terminals, such as kiosks, automatic teller machines, etcetera. Accordingly, a resident of the controlled environment facility is facilitated to utilize an access terminal to conduct transactions or other desirable exchanges of information, goods, services, etcetera. For example, an inmate in a prison facility may utilize a telephone system adapted according to the present invention to perform such functions as ordering items, such as commissary items, medical items, and library books, for himself or others (even individuals residing outside of the prison), inquire as to the status of ordered goods and services, inquire as to an account balance available to the inmate, place phone calls, including prepaid and collect calls, receive information about court dates or other appointments, receive special messages, announcements, and special offers, and/or the like. In accordance with the present invention, the resident may make use of these terminals to request deposits into their commissary accounts by third parties, such as family or friends.

The depositing party may make deposits in accordance with embodiments of the present invention in a number of ways, such as by the use of credit, or debit cards, check by phone, direct billing to their phone number, or the like.

Embodiments of the present invention provide for direct interaction with users, whether individuals residing within a controlled environment facility or individuals residing outside of the controlled environment facility, for transaction and information management using an intuitive interface, such as may implement voice and/or dual tone multiple frequency (DTMF) input. Interactive systems of embodiments of the present invention provide voice response, voice recognition, and/or other information communication to provide prompting to users, to accept user input and queries, to respond to queries, to confirm transactions, to provide account information, etcetera. Accordingly, interaction for conducting transaction and information management is substantially automated and integrated.

Interaction by users according to embodiments of the present invention includes various authorization and/or verification techniques. For example, voice print technology, finger print scanning, iris scanning, personal identification numbers (PINs), special codes, social security numbers, driver's license numbers and/or the like may be implemented to affirmatively identify individuals for conducting transactions. Authorization and/or verification according to preferred embodiments may be implemented to insure the identity of resident making a request. Authorization and/or verification according to preferred embodiments may also be implemented with respect to users residing outside of a controlled environment facility. For example, embodiments of the present invention may implement account deposit authorization with respect to a prison facility to provide control with respect to individuals who may deposit funds with respect to particular inmates.

Preferred embodiments of the present invention may be integrated with various aspects of transaction and information management such as disclosed in U.S. patent application Ser. No. 10/602,233 entitled "Systems and Methods for Transaction and Information Management," incorporated by reference above. For example, prepaid account management, collect calling services, commissary services, and account funding are all integrated according to embodiments of the present invention, to thereby facilitate seamless user interaction for account deposit, account status inquiry, commissary ordering, and collect calling. Embodiments utilize information technology already present in a controlled environment facility, such as a local area network, an intranet, the Internet, etcetera, to provide communication and interaction with third party suppliers and users desiring their goods and/or services.

Moreover, interactive systems of embodiments of the present invention operate intelligently to facilitate and/or optimize use thereof. For example, embodiments of the present invention may operate to identify low account value status and implement interaction to solicit deposit of funds. Such interaction may include notifying an individual associated with an account (such as a resident) of a current status and inquiring as to what actions are to be taken, contacting a secondary contact with respect to an account (such as a family member of an inmate) to solicit funds, and/or accepting funds via such means as check by phone, credit card, automatic withdrawal, etcetera. Revenue opportunities, such as commissions due to a controlled access facility and/or profits to entities providing goods and/or services, are preferably increased through the aforementioned embodiments, facilitating entry of money into the system. For example, by making it easier to get money into the system and/or by providing ease of operation, embodiments of the present invention enable the users to place orders more often, order more goods and/or services, and/or maximize the value of their available funds.

Monitoring and/or intelligence gathering according to embodiments of the present invention may provide audit capabilities, such as to trace what household deposited money into which accounts, how much money was deposited, when the money was deposited, or the like. Such monitoring and/or intelligence gathering functionality, particularly when based upon information available from various integrated aspects of transaction and information management, may be invaluable in providing controlled environment management.

It should be appreciated that preferred embodiments of the present invention substantially decrease costs associated with transactions, such as by taking paper and personnel out of the process as well as relieving need to collect for purchases after the goods or services are delivered. Accordingly, embodiments of the present invention deployed with respect to a controlled environment facility facilitate reallocation of man hours to achieve more value from personnel by allowing more time for such personnel to be engaged in tasks primary to the operation of the controlled environment facility. Moreover, security issues in particular situations, such as the aforementioned prison facility environment, may be decreased, e.g., interaction by prison facility and/or other third party service personnel with inmates may be decreased thereby diminishing opportunity for security breaches. Likewise, primary aspects of a controlled environment facility, such as security in a prison facility, may be increased according to embodiments of the present invention using authorizations and checks and balances provided by system automation and integration.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2 shows a block diagram of a controlled environment information management system deployed according to an embodiment of the present invention;

FIG. 3 shows detail with respect to aspects of the controlled environment information management system of FIG. 2 according to embodiments of the present invention;

DETAILED DESCRIPTION

Figure 1:
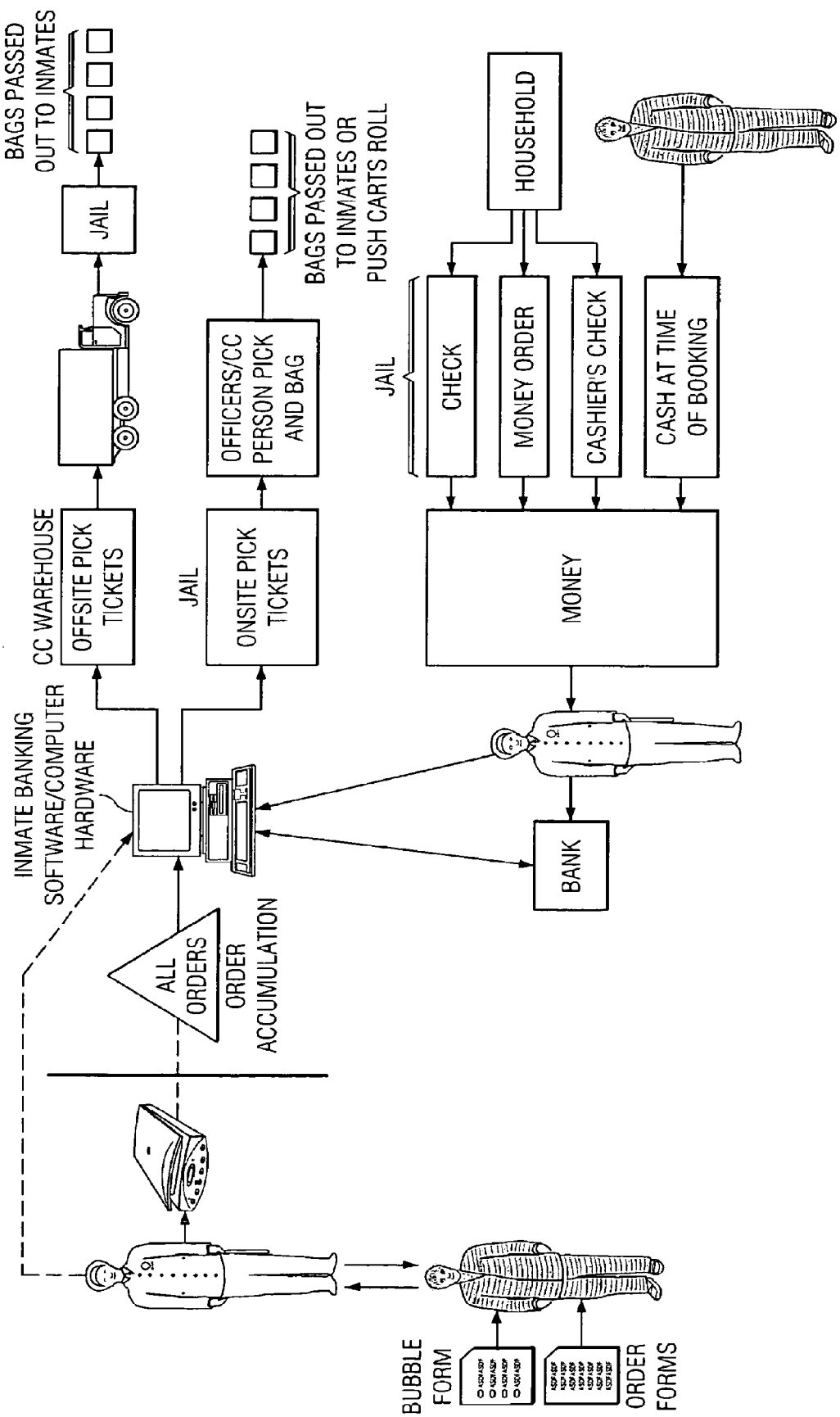
FIG. 1 shows an implementation of typical prior art commissary service.

Controlled environment facilities, such as inmate facilities, hospitals, nursing homes, and camps, may be thought of as a small community or city, perhaps walled or otherwise access restricted, wherein various activities occur within the community and between the community and those outside the community in the daily operation thereof. Such a community includes a number of individuals and enterprises directly associated therewith, including management, staff, and inmates, residents, patients, or guests (hereinafter referred to as residents), and a number of individuals and enterprises indirectly associated therewith, including friends and family of residents, vendors, government agencies, providers of services to residents, and individuals with a connection to the facility or its residents. Information is often exchanged and transactions are often conducted by, between, among, and on behalf of the aforementioned individuals and enterprises in performing the aforementioned daily activities.

It should be appreciated that in such a controlled environment, there may be unique relationships, situations, and information which may be leveraged in providing management functions or in conducting transactions. For example, information flowing from residents may be monitored and/or processed in an intelligence area to ensure the safety and security of those within the controlled environment facility and those outside of the facility. Moreover, information with respect to individuals and/or enterprises having an interest in residents of the controlled environment facility may be utilized in facilitating transactions, such as toll telephone calls and the purchase of commissary items. Accordingly, preferred embodiments of the present invention integrate deposit of funds and various functional aspects associated with a controlled environment facility to provide transaction and information management.

Thus, the present systems and methods preferably provide an information management engine having functionality for conducting transactions associated with a resident of a controlled environment facility. These transactions may include requests initiated by the resident of the controlled environment facility, directed to an indicated individual outside of the facility for deposit of funds to an account of the resident. This functionality also preferably conducts automated communication outside of the controlled environment facility to facilitate placing the requests. The transactions may include voice exchanges between the resident and the engine and/or a voice exchange between the individual outside of the controlled environment facility and the present system. Preferably, funds may be acquired from the individual outside of the controlled environment facility using techniques such as check by phone, credit card by phone and/or electronic funds transfer. The automated communication outside of the controlled environment facility to request a deposit may be invoked contemporaneously with the resident requesting the deposit, or at some time after the resident requests the deposit. The present systems and methods may collect and analyze biometric data to identify the resident in association with conducting transactions, such as deposit requests. This biometric data might include voice print data, finger print data, iris print data or the like. Furthermore the present systems and methods may make use of two or more levels of identification. A first the level of identification might include a first type of the biometric data. A second level of identification might include a second type of the biometric data or a user supplied identification string, such as a personal identification number (PIN), social security number, birth date, mother's maiden name, a serial number, an inmate number, a drivers license number, a government issued identifier, and/or the like.

Directing attention to FIG. 2, controlled environment information management system 210 adapted to employ an embodiment of the present invention is shown. System 210 provides transaction and information management within and associated with controlled environment facility 200. Specifically, controlled environment information management system 210 is deployed within controlled environment facility 200. Although illustrated as being deployed within the controlled environment facility in FIG. 2, it should be appreciated that controlled environment information management systems of the present invention may be deployed in a number of configurations. For example, embodiments of the present invention provide an information management system deployed external to the controlled environment facility and having data terminals and/or other access points deployed within the controlled environment facility. Additionally or alternatively, information management systems may be provided in a distributed topology, such as having server systems, application programs, and/or databases distributed throughout a number of geographic locals, according to embodiments of the present invention.

As shown in FIG. 2, controlled environment information management system 210 may provide a number of access points coupled to a variety of user terminal equipment configurations. User terminal equipment utilized according to preferred embodiments of the present invention may include personal computers, personal digital assistants (PDAs), pagers, telephones (wireline and wireless), facsimile machines, kiosks, and the like, coupled through direct links, such as wireline, cable, fiber optic, or the like, and/or indirect links, such as network links (e.g., local area networks (LANs), metropolitan area networks (MANs), wide area networks (WANs), intranets, extranets, the Internet, cellular networks, the public switched telephone network (PSTN), and/or the like), private branch exchange (PBX) links, or the like. Accordingly, information management system 210 of the illustrated embodiment provides connectivity to user terminals 222-1 through 222-M disposed within controlled environment facility 200 via direct connections, user terminals 221-1 through 221-N disposed within controlled environment facility 200 via indirect connections (here comprising a network or networks, referred to herein as network 220), and user terminals 231-1 through 231-P disposed external to controlled environment facility 200 via indirect connections (here comprising XML connections and/or a network or networks, referred to herein as network 230). It should be appreciated that information communication links utilized according to the present invention are not limited to wireline links and, therefore, may utilize wireless, optical, and/or other information communication links.

In accordance with the preferred embodiment of the present invention, controlled environment information management system 210 is adapted to include intelligence/management functionality 211 and transaction/commerce functionality 212. Preferably, intelligence/management functionality 211 provides for collection, storage, and movement of information for managing various operational aspects of the controlled environment facility, including the management of personnel, residents, vendors, and resources. Transaction/commerce functionality 212 preferably provides for the instigation and completion of various transactions, including requesting and providing goods and services, determining credit worthiness, verifying account balance and status, providing for payment, and providing for deposits such as direct deposit functionality 213. The aforementioned functionalities of information management system 210 are preferably provided at any distance and at any time.

It should be appreciated that, although intelligent/management functionality 211 and transaction/commerce functionality 212 are shown in FIG. 2 disposed in controlled environment information management system 210, various structural and/or functional aspects of these components may be provided by different entities and/or may be disposed inside of and outside of controlled environment facility 200. For example, a controlled environment facility may implement core transaction/commerce functionality in the form of a call application management system, and a third party commissary may interface enhanced transaction/commerce functionality in the form of commissary services thereto. Additionally or alternatively, a third party (whether the same or different than the above third party) may interface intelligence/management functionality with the transaction/commerce functionality. Multiple systems, whether disposed remotely, locally, or combinations thereof, may be utilized in implementing the aforementioned controlled environment information management system 210.

Directing attention to FIG. 3, an example configuration of structural and/or functional aspects of transaction/commerce functionality 212 is shown. For example, in the embodiment of FIG. 3, software/hardware (box 351) may be coupled to a controlled environment call application management system (box 352) via voice lines using a voice system (box 353), such as may comprise a VRU. The voice lines may be internal to the controlled environment facility, such as provided by PBX 354, and/or external to the controlled environment facility, such as provided by PSTN 355. Software/hardware 351 may also be interfaced with a banking facility 360 or the like outside of facility 200. It should be appreciated that one or more of the components of transaction/commerce functionality 212 illustrated in FIG. 3 may be disposed external to controlled environment facility 200, according to embodiments of the invention.

Figure 4:
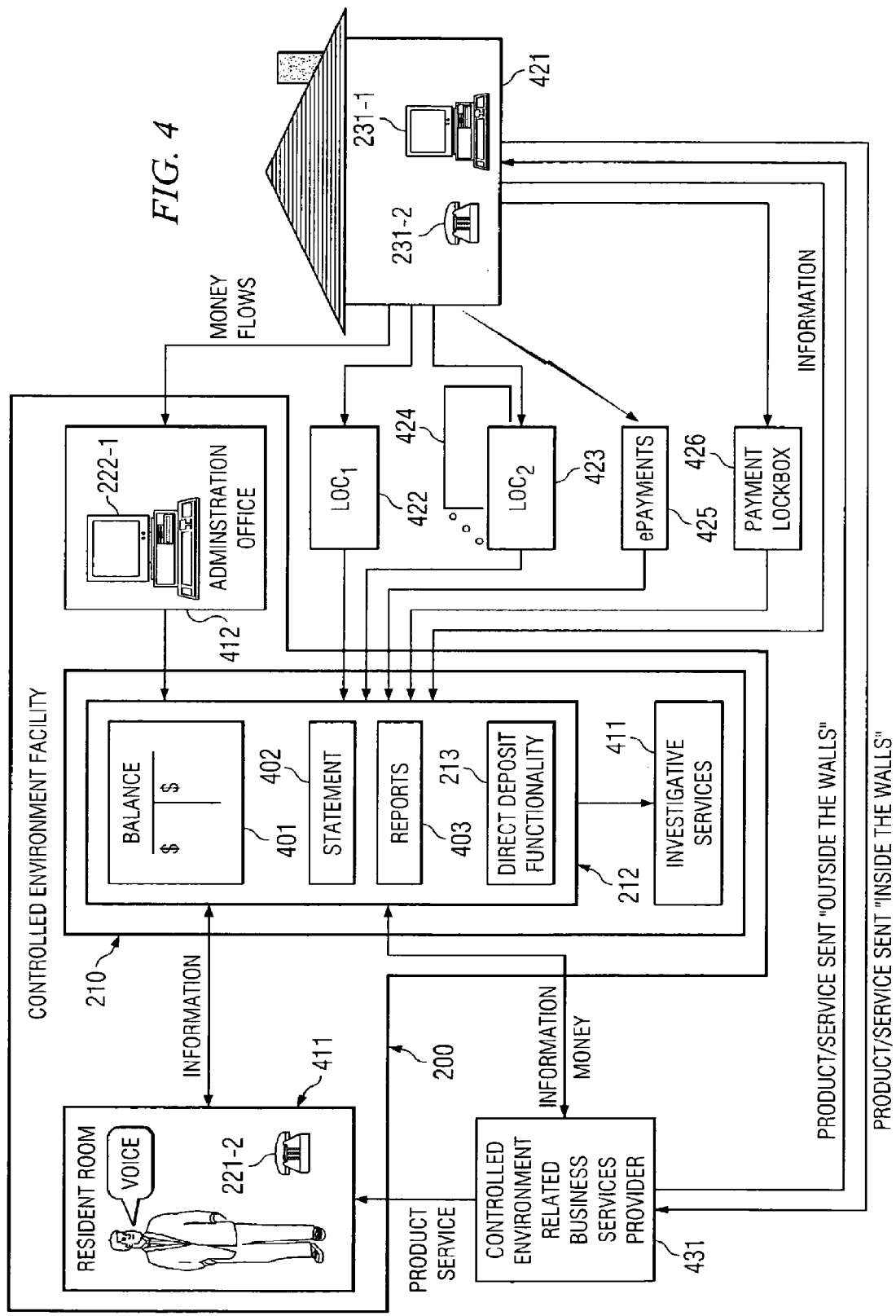
FIG. 4 shows detail with respect to an exemplary deployment of the controlled environment information management system of FIG. 2.

Directing attention to FIG. 4, detail with respect to an exemplary deployment of an embodiment of the present invention is shown. As shown in FIG. 2, controlled environment information management system 210 provides transaction and information management and connectivity with respect to a plurality of entities. For example, individuals disposed within controlled environment facility 200, such as residents of controlled environment facility 200 having access to resident room 411 (such as may comprise a hospital room, prison cell, camp cabin, common use room, etcetera), are provided access to controlled environment information management system 210 for interaction therewith, such as via telephone 221-2. Additionally, in the embodiment of FIG. 4, individuals disposed in controlled environment facility 200, such as controlled environment personnel having access to administrative office 412 (such as may comprise a patient information station, a doctor's office, a general administration office, a guard station, etcetera), are provided access to controlled environment information management system 210 for interaction therewith, such as via computer 222-1. Computer 222-1 or a similar service terminal may be located in a portion the facility such as in a visitation room or lobby area. Individuals disposed outside of controlled environment facility 200, such as friends and family residing at residence 421 are provided access to controlled environment information management system 210 for interaction therewith, such as via computer 231-1 and/or telephone 231-2. Additionally, in the embodiment of FIG. 4, individuals disposed outside of controlled environment facility 200 are provided access to controlled environment information management system 210 for interaction therewith at locations 422 through 424, such as may be associated with various businesses, service providers, and/or the like, such as via any of terminals 231-1 through 231-P. Controlled environment related business services providers 231, such as telephony service providers, commissary goods and services providers, health care providers, etcetera, as may be disposed in and/or outside of controlled environment facility 200 may be provided access to controlled environment information management system 210 for interaction therewith, such as via any of terminals 221-1 through 221-N, 222-1 through 222-M, and/or 231-1 through 231-P.

It should be appreciated that, although particular embodiments of user terminals have been shown or referenced above with respect to particular individuals and/or locations, the present invention is not limited to the use of any particular user terminal configuration or configurations with respect to individuals and/or locations. For example, administration office 412 may additionally or alternatively include telephones for providing interaction with controlled environment information management system 210. Furthermore the user terminal may take the form of kiosks or automated equipment capable of taking deposits, similar to an automated teller machine. Moreover, there is no limitation according to the present invention with respect to the number of user terminals which may be provided with respect to an individual and/or location.

It should further be appreciated that, although particular individuals and/or locations have been shown or referenced above for interaction with controlled environment information management system 210, the present invention is not limited to the individuals and/or locations of the exemplary embodiment. For example, embodiments of the invention may provide connectivity for interaction between a plurality of controlled environment facilities, if desired.

According to a preferred embodiment, controlled environment information management system 210 is deployed in association with a prison facility. In operation according to an exemplary embodiment wherein controlled environment facility 200 is a prison facility, an inmate may pick up a phone, such as telephone 221-2, and communicate information to controlled environment information management system 210 to access limited information and/or conduct certain proscribed transactions. Controlled environment information management system 210 may take that information, or some portion thereof, and communicate it to an inmate related business service provider, such as controlled environment related business services provider 431. This entity may, responsive to such information, provide a product or service to the inmate. For example, particular authorized goods may be delivered to the prisoner within controlled environment facility 200. Additionally or alternatively, services, such as medical care or telephony services may be provided to the inmate.

The aforementioned resident's use of controlled environment information management system 210 is not limited to transactions for the acquisition of goods and/or services. In accordance with the present invention a resident may utilize the aforementioned phone or terminal to place a request through environment information management system 210 that a third party be requested to deposit funds in his commissary account.

According to preferred embodiments, account balances are maintained for individuals using controlled environment information management system 210, which may be utilized in paying for the aforementioned goods and services. The illustrated embodiment, for example, includes account balance database 401 of transaction/commerce functionality 212. Account balance database 401 may comprise prepaid account balances and/or post paid account balances and is preferably utilized with respect to various transactions conducted using controlled environment information management system 210. For example, payment for goods ordered by a prisoner or friends and family may be made by a transfer of credit value from controlled environment information management system 210 to controlled environment related business services provider 431, such as using statement system 402.

Funds may be provided to account balance database 401 in a number of ways, such as various means of deposit by friends and family of an inmate. For example, friends and family may deposit funds into the system via such techniques as sending a money order or a cashier's check via the mail or bringing cash into the prison at the time of visitation for entry into the system, such as by administration office 412. However, to facilitate the deposit of such funds, preferred embodiments provide for indirect, remote, and/or electronic deposit, such as via locations 422 through 424, electronic payment system 425, and payment lockbox 426, such as shown and described in the above referenced patent application entitled "Information Management and Movement System and Method." Electronic payments may be made using a credit card, check conversion, or electronic funds transfer, for example, via electronic payment system 425, such as may comprise the Internet or a telephony system. Additionally or alternatively, a payment lockbox or lockboxes, such as payment lockbox 426, may be provided in association with controlled environment information management system 210 to accept payment, such as in the form of cash, check, money order, credit card, electronic fund transfer, etcetera. Such locations and/or payment techniques may be more convenient to such individuals and thereby facilitate their depositing funds into controlled environment information management system 210.

In operation according to a preferred embodiment, controlled environment information management system 210 monitors, processes, and/or compiles information with respect to transactions and information processed therethrough. For example, statement system 402 and report system 403 may cooperate to derive information with respect to what household deposited money for a particular inmate, what goods and services that inmate ordered, and generate various reports about usage of the system by individuals. Such information may be provided to investigative services of intelligence/management functionality 411 for analysis, and perhaps appropriate action. For example, intelligence/management functionality 411 may be operable to collect data regarding deposits requested by a resident, individuals outside of the controlled environment facility requested by the resident to deposit funds, and/or individuals outside of the controlled environment facility making deposits in an account of an resident.

In accordance with the present invention transaction/commerce functionality 212 includes direct deposit functionality 213 providing for deposit of funds by an individual outside of the controlled environment facility at the behest of a resident of controlled environment facility 200. Preferably, direct deposit functionality initiates a telephone call to the individual outside of the controlled environment facility to solicit the funds. A call application management system, such as box 352, may provide a telephone interface for use with the controlled environment facility automated transaction processing system by the resident and the individual outside of the controlled environment facility.

Figure 5:
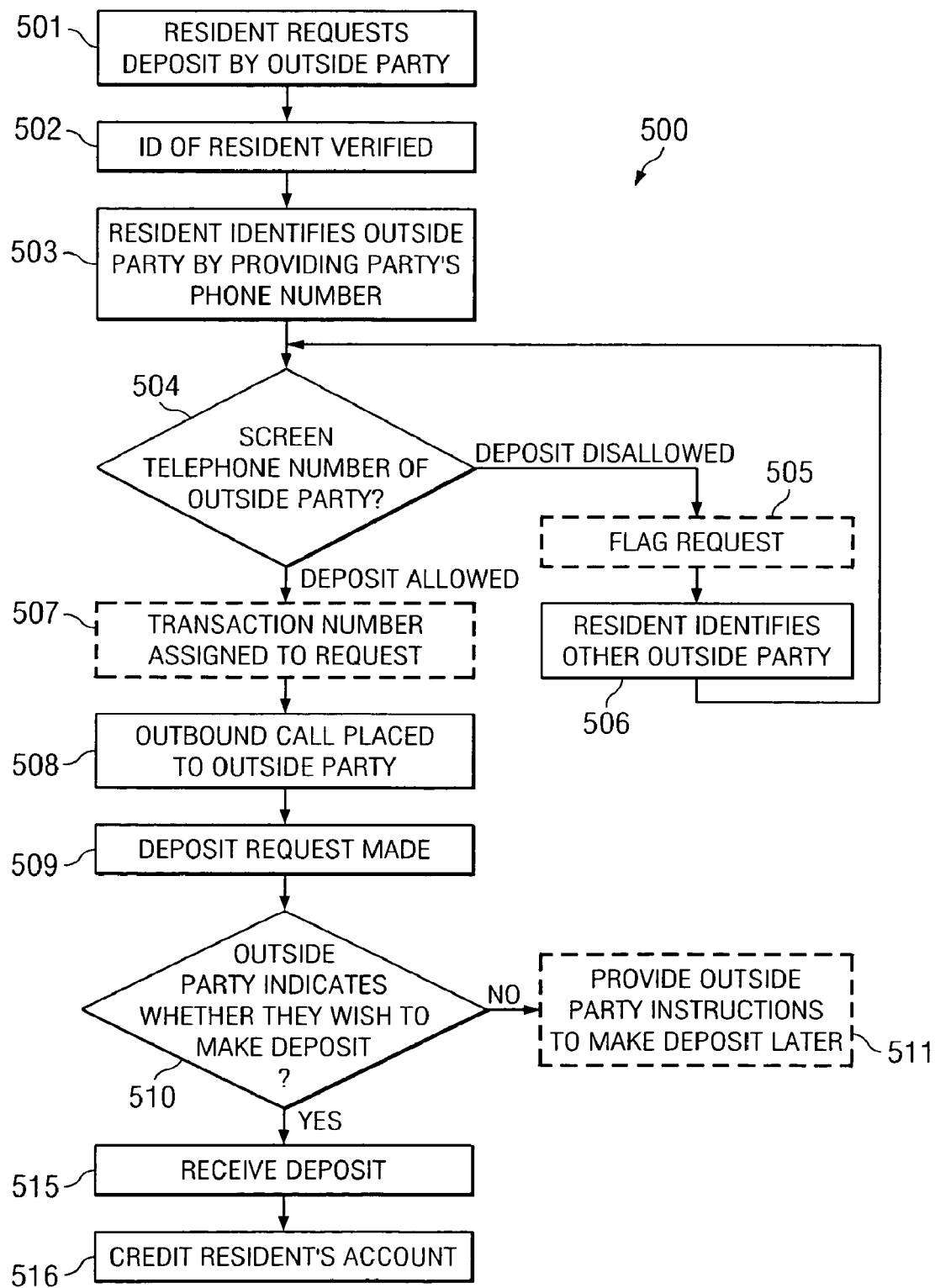
FIG. 5 shows a flow diagram of operation of an embodiment of the present invention.

Having described an exemplary deployment of an embodiment of the present invention, attention is directed toward FIG. 5 wherein a flow diagram of operation of embodiment 500 of the present methods for facilitating deposits into transaction system 212, via functionality 213, is shown. At 501 a resident of a controlled environment facility indicates that he or she wishes to request a deposit from a party outside said controlled access facility into a transaction account maintained by said transaction processing system for said resident. The request at 501 may be initiated as a result of the automated transaction processing system inquiring from the resident whether the resident would like to request a deposit from a party outside the controlled access facility. This inquiry might be made when a resident places a call, and/or when the resident's account balance has fallen to a predetermined level. The indication at 501 may be received by the aforementioned automated transaction processing system and if a "name tag" for the resident is not on file a recording of the resident speaking his or her name may be made for provision to the outside party during communication of the deposit request.

At 502 the identity of the resident is preferably verified. Verifying the identity for the resident might include, at least in part, the resident entering an identification string, such as a PIN, social security number, birth date, mother's maiden name, a serial number, an inmate number, a drivers license number, government issued identifier, and/or the like. Additionally or alternatively, verifying the identity of the resident might, at least in part, include collecting and analyzing biometric data to identify the resident. The biometric data might include voice print data, finger print data and/or iris print data. The verification of identity may include using at least two levels of identification. A first level might include a first type of the biometric data with a second level using a second type of the biometric data or a resident supplied identification string, as discussed above.

At 503 a telephone number of a the outside party from whom a deposit is being requested is obtained from the resident, such as by having the resident key the number in, or having the resident speak the number for a IVR unit. At 504 the telephone number of the outside party obtained from the resident is screened to determine if the resident is allowed to request deposits by the indicated outside party. The request by the resident may be flagged at 505, in response to the resident not being allowed to request deposits by the outside party, for investigative purposes or the like. In response to the resident not being allowed to request deposits by the outside party, the resident may be prompted at 506 to provide a telephone number of another outside party from which to request a deposit.

If it is determined that a deposit request of the indicated party is permissible at 504, The request may be assigned a transaction number or the like at 507 and the transaction system and/or functionality associated therewith may then place and outbound telephone call to the outside party at 508. The automated transaction processing system or associated functionality may then communicate the deposit request to the outside party at 509. This communication will preferably include identifying the requesting resident, such as by using the aforementioned "name tag," and providing any other pertinent information, such as the resident's facility. The outside party will then, at 510 preferably provide an indication as to whether the party wishes to make the deposit to the account. This indication may take the form of entry of a DTMF code or a spoken instruction, which will preferably be accepted by the automated transaction processing system and/or an associated IVR unit. In response to the party indicating that the party does not wish to deposit funds into the account, instructions may be provided at 511 to the party for later depositing funds into the account. The instructions may be repeated, such as at the request of the called party.

If the outside party has elected to make a deposit at 510, the deposit will be received by the automated transaction processing system at 515. The deposit may be made using any of several techniques, such as check by phone, credit card by phone and/or electronic funds transfer. At least a portion of the deposit is credited to the requesting resident's account at 516, such as by depositing the funds in a bank account associated with the facility. This crediting may also include various bookkeeping functions such as recording the deposit as a transaction in the account. Furthermore, the received deposit may be reported to at least one third party, such as a controlled environment facility management system, a vendor associated with the controlled environment facility, and/or an investigative entity. A portion of the received deposit may be paid to an entity practicing the present systems or methods.

Embodiments of the present invention may operate to facilitate replenishment of account balances, such as by invoking interrupt messaging to solicit funds as a minimum threshold amount is reached through contacting a designated responsible party with respect to the account, as shown and described in the above referenced patent application entitled "System and Method for Account Establishment and Transaction Management Using Interrupt Messaging." For example, an outbound message, e.g., a phone call, electronic mail message, etcetera, may be sent by the controlled environment information management system to one or more friend or family member designated to solicit deposit of funds upon detection of a minimum threshold amount. Additionally or alternatively, the controlled environment information management system may set a flag with respect to the account balance condition such that, the next time the responsible party is called by the user, interrupt messaging is invoked to solicit funds from the responsible party during the call.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
   a correctional facility automated transaction processing system providing for deposit of funds by an individual outside of said correctional facility at the behest of a resident of said correctional facility, wherein said automated transaction processing system further comprises:
   an information management system integrated with said correctional facility automated transaction processing system, configured to provide a communication interface for use with said correctional facility automated transaction processing system by said resident and said individual outside of said correctional facility, wherein said communication interface is configured to initiate communications with said individual located outside the correctional facility and to prompt said individual located outside the correctional facility to deposit funds into a commissary account for use by said resident of the correctional facility, wherein the communication interface communicates with said outside individual to acquire the deposit without directly connecting said resident of the correctional facility and said outside individual; and
   an computer interface configured to accept said deposit of funds from an individual outside of said correctional facility, wherein,
   if the outside individual wishes to deposit the funds, the computer interface accepts an indication as to a deposit type, and credits at least a portion of the deposit to a resident account; and
   if the outside individual does not wish to deposit funds into the resident account, the computer interface provides instructions to the outside individual for later depositing funds into the resident account.

2. The system of claim 1, further comprising:
an intelligence management system integrated with said correctional facility automated transaction processing system and configured to collect data regarding said deposit requested by said resident.

3. The system of claim 1, further comprising:
an intelligence management system integrated with said correctional facility automated transaction processing system and configured to collect data regarding said individual outside of said controlled environment facility requested by said resident to deposit funds.

4. The system of claim 1, further comprising:
an intelligence management system integrated with said correctional facility automated transaction processing system and configured to collect data regarding said individual outside of said controlled environment facility making deposits in an account of a resident.

5. A method for managing transactions within a correctional facility, comprising:
providing an information management engine comprises a computer processor integrating transaction functionality and communication functionality between a resident of the correctional facility and an individual outside of the correctional facility;
establishing a commissary account associated with a resident of the correctional facility;
using the information management engine to conduct transactions associated with the resident of the correctional facility, the transactions including at least a request by the resident for a deposit into the commissary account by a party outside of the correctional facility using a communication unit to initiate communication to the outside party and to interface with the outside party to request or acquire a deposit, wherein the communication unit is configured to initiate communications with the party outside of the correctional facility and to prompt the party outside of the correctional facility to deposit funds into the commissary accounts of the resident, and wherein the communication unit interface with the outside parties to acquire the deposit without directly connecting the resident of the correctional facility and the outside party;
if the outside party wishes to make the deposit, accepting, by the communication unit, an indication as to whether the party wishes to make the deposit to the account;
receiving the deposit;
crediting at least a portion of the deposit to the account; and
if the outside party does not wish to deposit funds into the account, providing instructions to the outside party for later depositing funds into the account.

6. The method of claim 5, further comprising:
receiving the deposit, using a technique selected from the group consisting of: check by phone, credit card by phone, and electronic fund transfer.

7. The method of claim 5, further comprising:
using biometric user identification technology or other unique identifier to verify the resident.

8. The method of claim 7, wherein the biometric user identification technology is selected from the group consisting of:
voice print technology;
finger print technology;
iris print technology; and
retinal print technology.

9. The method of claim 5, wherein the communications are telephone calls placed contemporaneously with the resident requesting the deposit.

10. The method of claim 5, wherein the communications are telephone calls placed after said resident requests said deposit.

11. The method of claim 5, further comprising:
utilizing the information management engine to acquire the deposit.

12. The method of claim 11, wherein utilizing the information management engine comprises:
using an interactive voice response to interface with users of the information management engine.

13. The method of claim 12, wherein the interactive voice response includes voice command recognition.

14. A secure information management system for conducting transactions associated with a resident of a correctional facility, comprising:
a plurality of access points adapted to securely communicate with user terminal equipment, a first set of the access points coupled directly to secure user terminals located within the correctional facility and a second set of the access points coupled indirectly to user terminals located outside the correctional facility;
an automatic transaction processing system for performing commerce transactions, the commerce transactions comprising providing goods and services, determining credit worthiness, verifying account status, and managing payments and deposits;
a communication unit coupled to the automatic transaction processing system for performing commerce transactions, the communications unit coupled to the user terminals located within the correctional facility and to the user terminals located outside the correctional facility, the communication unit adapted to initiate calls to parties located outside the correctional facility and to prompt the parties located outside the correctional facility to deposit funds into commissary accounts for use by inmates of the correctional facility, wherein the communication unit interface with the outside parties to acquire the deposit without directly connecting the inmates and the outside parties;
if the outside parties wish to make the deposit, the communication unit accepts an indication as to whether the parties wish to make said deposit to an account;
the automatic transaction processing system for performing commerce transactions receives the deposits, and credits at least a portion of the deposits to the account; and
if said outside individuals do not wish to deposit funds into said accounts, the communication unit provides instructions to said outside individuals for later depositing funds the accounts.

15. The secure information management system of claim 14, further comprising:
a secure call application management system operating under control of the automatic transaction processing system for performing secure commerce transactions to provide call connections between the parties located outside of the correctional facility and the inmates which can be accessed and monitored by investigators.

16. The secure information management system of claim 14, wherein the automated transaction processing system for performing commerce transactions receives the deposits using a technique selected from the group consisting of: check by phone, credit card by phone, and electronic fund transfer.

17. The secure information management system of claim 14, further comprising:

a secure information management engine for collecting and storing information for managing personnel, residents, vendors and resources associated with the correctional facility.

18. The information management system of claim 17, wherein the information management engine for collecting and storing information and the automatic transaction processing system for performing commerce transactions are the same device.

* * * * *